June 13, 1967     A. JOHNSON     3,324,828

ANIMAL TOILET FIXTURE

Filed July 6, 1965

INVENTOR.

Alberta Johnson

BY

Robert A. Halvorsen 3,324,828
ANIMAL TOILET FIXTURE
Alberta Johnson, 1210 N. Garden Ave.,
Clearwater, Fla. 33515
Filed July 6, 1965, Ser. No. 469,715
1 Claim. (Cl. 119—1)

This invention relates to an improved toilet for domesticated animals which may be used in a house or apartment as well as outdoor locations.

A principal object of this invention is to improve the operation and make the use of such devices more comfortable and simple by both the animals who use it and the persons who operate the flushing controls.

Another object is to improve the device, upon which Patent 2,464,580 was granted to this inventor on Mar. 15, 1949, to eliminate some of the difficulties which arose in the use of said earlier patented device.

In the use of said prior patent it was occasionally found that pets were reluctant to step across the water-filled circular trough which surrounded the central platform which was provided for the defacation of the pet. An entrance platform which provides in effect a bridge over said trough has been found to greatly reduce the time and effort needed to train a pet to the use of this toilet fixture.

The earlier concept also proved to be objectionable in that if a period elapsed between the time the toilet was used and when a person flushed it, the solid excreta sometimes hardened to a degree that it acted as a dam to the flow of flushing water which had two alternative paths from the inlet to discharge. In such event the flushing water simply by-passed the soiled material, flowed the alternative path, and did not properly remove such material.

This objection has been overcome by directing the flushing water in a positive circumferential path which effectively removes all solids.

Figure 1:
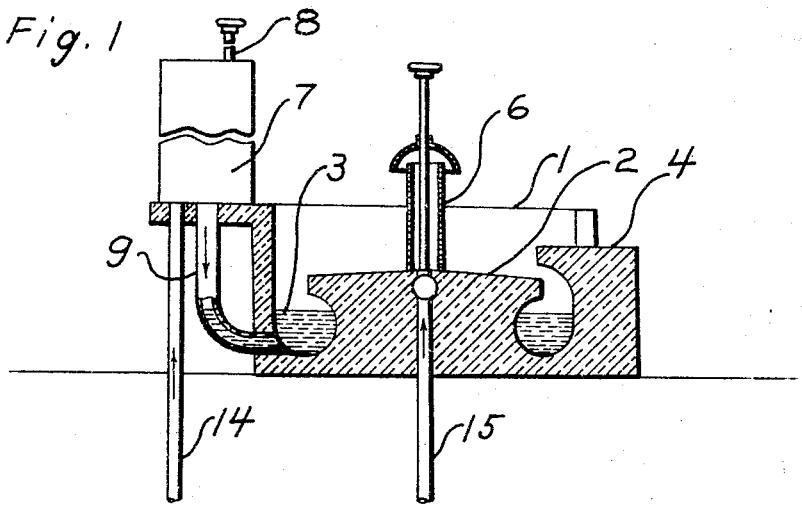
FIGURE 1 is a central vertical section of the animal toilet.
Figure 2:
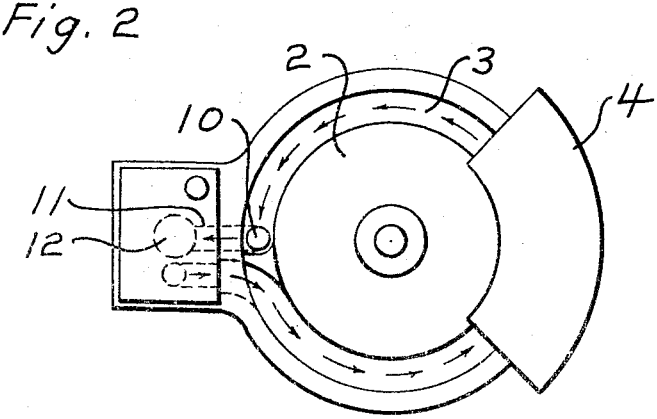
FIGURE 2 is a top plan view of the animal toilet.

Referring to the drawings, in which like numerals refer to similar parts, 1 represents generally a toilet fixture comprising a central platform 2 which is elevated above generally circular trough 3 which surrounds platform 2.

An entrance platform 4 extends from the outer edge of the fixture and projects over trough 3 for a minor portion thereof.

At the center of platform 2 a vertical post 6 is rigidly mounted, provided with connections for intermittently washing down said post and also platform 2 in the manner shown in said Patent 2,464,580.

Trough 3 is provided with means for flushing and cleaning it, comprising a storage reservoir for water 7, a conventional valve 8 for intermittent discharge of said stored water into trough 3, and an inlet tube 9 to direct said water tangentially into trough 3. A discharge orifice 10 is provided adjacent inlet tube 9 for the discharge of water and other materials carried by said water after it has travelled substantially completely around circular trough 3.

Discharge orifice 10 is provided with a conventional antisiphon trap 11 and a sewer connection 12 for connection to a sewer line.

Entrance platform 4 is sloped gently downwards towards central platform 2 for ease in sweeping dirt towards said central platform. Platform 4 also preferably is broad adjacent the outer perimeter and becomes progressively narrower as it approaches the center. Both platforms 4 and 2 are preferably surfaced with a non-skid material which will not impede the flushing off of execreta and wash water.

A storage tank water supply 14 and a water supply 15 for post 6 are connected to a conventional water system.

In the operation of this fixture a dog, cat or other animal pet may be easily trained to step upon entrance platform 4 and thence down upon central platform 2. Male dogs can be expected to urinate upon post 6. Other animals will urinate and defecate on platform 2.

It is customary in large cities for pets to be trained to utilize the streets adjacent the curbstones for such purposes, an act which differs from their untrained tendency to indiscriminately use sidewalks and the walls of buildings.

The widespread use of this invention similarly improves the healthfulness and esthetic satisfaction to persons who use our city streets.

The installation of the herein described toilet fixture at some inconspicuous location on the lawn of the owner of a pet will enable his famly to use his lawn without concern for destruction of foliage by urine from their pet, and to walk on the lawn without disconcerting encounters with solid excreta.

What I claim as my invention is:

In an animal toilet device a raised central platform of a size to support an animal, a hollow post projecting vertically from said platform, means for admitting water to the lower end of said post and for discharging water from said post upon said platform, a depressed substantially circular trough provided in said device and surrounding said platform, an inlet for admitting water tangentially into said trough, means for discharging water from said trough after the water therein has flowed from the inlet substantially completely around said trough, and an entrance platform above said central platform which extends from an outer perimeter of the device and projects above the trough to a point above said central platform.

References Cited
UNITED STATES PATENTS

| 920,781 | 5/1909 | Simmons | 119—74 |
| 1,813,329 | 7/1931 | Supplee | 119—15 |
| 2,464,580 | 3/1949 | Johnson | 119—1 |
| 3,085,550 | 4/1963 | Crawford | 119—1 |

SAMUEL KOREN, Primary Examiner.

HUGH R. CHAMBLEE, Examiner.